3,030,373
EMULSION PURIFICATION OF MERCAPTO-
BENZOTHIAZOLE
Leslie Szlatinay, St. Albans, W. Va., assignor to Monsanto Chemical Company, St. Louis, Mo., a corporation of Delaware
No Drawing. Filed May 1, 1959, Ser. No. 810,247
4 Claims. (Cl. 260—306)

The present invention relates to the purification of mercaptobenzothiazole and especially to the purification of mercaptobenzothiazole made by the Kelly process.

The preparation of mercaptobenzothiazole from aniline, sulfur and carbon bisulfide was described in U.S. Patent 1,631,871, granted to Kelly June 7, 1927. Usually these reactants are heated above 200° C. under pressure. This is the method most generally used for industrial manufacture. However, the product contains a number of impurities which it is necessary for most purposes to remove. These include benzothiazole, sulfur and unidentified tars. It is common practice to upgrade the product by converting to a water soluble salt by the use of such bases as sodium hydroxide, sodium bicarbonate and sodium carbonate and precipitating the mercaptobenzothiazole from an aqueous solution of its soluble salt by acidification. However, this procedure has a disadvantage of consuming substantial quantities of base and acid. While it has been proposed to reduce the benzothiazole content by distillation, this practice is not uniformly successful because heat tends to decompose mercaptobenzothiazole to benzothiazole, especially when the quality of the batch happens to be low. Quenching the crude hot product in organic solvents or in dilute acid has been proposed but organic solvents are expensive in material and in processing to recover them. Quenching in dilute acid requires acid resisting equipment and thorough washing to remove acid. In general quenching in aqueous medium fails to give the required degree of purity.

The presence of impurities in the product lowers the melting point, results in dark color and interferes with subsequent operations involving use of the product as an intermediate. The presence of impurities persists in derivatives prepared from the impure mercaptobenzothiazole. Moreover, mercaptobenzothiazole containing more than about 1% benzothiazole used for manufacture of sulfenamides tends to produce sticky products and to lower the stability of the sulfenamide. The presence of sulfur is particularly objectionable for the latter reason. Small amounts of sulfur reduce stability whereas procedures heretofore available left significant amounts in the final product.

One of the objects of the present invention is to provide a simple method for purification of mercaptobenzothiazole. A particular object is to provide an efficient method for removing benzothiazole and sulfur or at least reducing them to acceptable low levels. Still another object is to provide an economical method of purification which reduces or avoids the consumption of chemical purification adjuvants. A particular object is to provide a purification process which employs only a minor quantity of organic solvent. A further particular object is to provide a process which employs an organic solvent that does not have to be recovered in an added step.

In accordance with this invention it has been found that mercaptobenzothiazole can be separated from impurities including benzothiazole and sulfur by dispersing the crude material in an emulsion of a water immiscible organic solvent in water. The proportion of organic solvent will be less than the water. Fine particle size and efficient wetting of the particles are important. Comminution of the crude mercaptobenzothiazole may be effected either before or after addition of the emulsion. Moreover, it is feasible to disperse the crude mercaptobenzothiazole in water alone followed by addition of the solvent. The solvent selected should be a solvent for sulfur. Examples of suitable solvents comprise monochlorobenzene, orthodichlorobenzene, toluene, benzene, carbon bisulfide and perchloroethylene.

In one embodiment of the invention crude molten mercaptobenzothiazole is gradually added to vigorously agitated hot water in the presence of a surface active agent followed by cooling, addition of carbon bisulfide and continued stirring in the presence of the resulting emulsion. According to a preferred embodiment crude mercaptobenzothiazole is heated and stirred under superatmospheric pressure in an emulsion of carbon bisulfide and water. Temperatures up to about 175° C. are suitable but at higher temperatures side reactions involving carbon bisulfide are noticeable.

The impurities in crude mercaptobenzothiazole, probably the tars, have some emulsifying properties but it is usually desirable to add a surface active agent to promote emulsification and to aid in wetting of the particles by the emulsion. In general, the particular surface active agent is a matter of indifference but some, of course, are more effective emulsifying agents than others. Examples of suitable surface active agents comprise alkylated aromatic sodium sulfonates as for example, sodium dodecylbenzenesulfonate, sodium decylbenzenesulfonate, dibutyl ammonium dodecylbenzenesulfonate, alkali metal salts of sulfated fatty alcohols, alkali metal soaps, more particularly sodium or potassium soaps of higher fatty acids or ethylene oxide condensation products of diverse materials. These include alkyl phenols, tall oil, higher mercaptans and higher alcohols, all of which are used as raw materials for preparation of nonionic surface active agents by condensation with ethylene oxide. Products obtained by condensing 100 parts of tall oil with 140–160 parts by weight ethylene oxide are examples of nonionic wetting agents available. Another example is the condensation product of one mole of oleic acid with 10–15 moles of ethylene oxide. Still others are condensation products of one mole of octyl, nonyl, decyl, undecyl or dodecyl mercaptan with 7–15 moles of ethylene or propylene oxide. If an anionic wetting agent is selected it is desirable to adjust the pH of the wash liquors to 3 to 4 before filtration. On the other hand, no acidification is necessary if a nonionic surface agent is selected. The selection of a nonionic surface active agent has the further advantage of reducing the foaming tendencies. Rapid stirring tends to promote foaming with anionic emulsifying agents whereas rapid stirring is otherwise desirable. Efficiency of stirring may be increased by passing a stream of air or other gas into the emulsion containing the mercaptobenzothiazole in which case a non-foaming surface active agent is a distinct advantage.

The ratio of the emulsion to crude mercaptobenzothiazole may vary considerably and is not a critical feature of the invention, being limited only insofar as a minimum is concerned by the quantity which provides a fluid system that can be processed. The weight of the emulsion should at least equal the weight of the mercaptobenzothiazole, otherwise the mixture becomes too thick and unwieldy to process satisfactorily. An important advantage of the process is the low organic solvent requirement which in nowise need exceed the quantity of water and is preferably much less. Significant improvement was observed with as little as 5 parts solvent per 300 of water as compared to water alone. Based on the weight of the crude mercaptobenzothiazole 10–30% by weight solvent is preferred. Carbon bisulfide is a preferred solvent because the organic liquors may be recycled to the autoclave for the preparation of further quantities of mercaptobenzothiazole thereby eliminating a separate recovery step.

When using carbon bisulfide the purified mercaptobenzothiazole is removed from the emulsion, then the emulsion broken, the organic layer separated and analyzed to determine the aniline and sulfur values. Neglecting operational losses, the quantity of carbon bisulfide is known for the amount charged. Carbon bisulfide and other volatiles are separated from the mother liquor and the weight of tars remaining determined. These tars are analyzed for their nitrogen content. An empirical formula which enables the calculation of the useful aniline content is the following:

$$\text{Aniline equivalent} = \frac{\text{grams of tar} \times N_2 \text{ percent} \times 12}{2 \times 100}$$

Similarly, an empirical formula for determining the sulfur equivalent of the mother liquor is the following:

$$\text{Sulfur} = \frac{\text{grams of tar} \times \text{percent free sulfur}}{2 \times 100}$$

The charges of fresh aniline, sulfur and carbon bisulfide are reduced by the amounts charged with the mother liquor to the autoclave. Good results are obtained by assuming all the nitrogen is present as aniline and by reducing the new sulfur charged by the full amount of free sulfur contained in the tars according to the analysis but the results are somewhat better using the foregoing formulae.

*Example 1*

Molten mercaptobenzothiazole (100 parts by weight) made by the Kelly process is gradually added to a warm (20° C.) solution of 1 part by weight of 30% aqueous sodium dodecylbenzenesulfonate in 400 parts by weight of water. The temperature of the mercaptobenzothiazole is preferably about 200° C. and the aqueous mixture is vigorously agitated during the addition thereof. The mercaptobenzothiazole is thereby dispersed in the aqueous medium, solidified and converted to small pellets, the temperature of the water rising to 80–85° C. in the process. Stirring is continued while the slurry is gradually cooled to 40–42° C. and then 40 parts by weight of carbon bisulfide is added and agitation with cooling continued for 1½ hours to 2 hours. During this time the temperature of the finely dispersed emulsion-like slurry reaches a temperature of 20° C. The slurry is then filtered, the filter cake washed with a little carbon bisulfide, then with cold and with warm water and dried at 60–70° C. The assay of the mercaptobenzothiazole is 97%, benzothiazole content 0.6% and sulfur 0.7%. About 3 to 4% of the mercaptobenzothiazole is lost in the purification.

*Example 2*

To a well agitated mixture of 300 parts by weight water, 30 parts by weight carbon bisulfide and 1 part by weight nonionic emulsifier, 100 parts by weight molten crude mercaptobenzothiazole made by the Kelly process is gradually added. The temperature is kept below about 45° C. during the addition. The slurry is then filtered and the filter cake washed with a little carbon bisulfide and then with cold and with warm water and dried at 60–70° C. as described in Example 1. The assay of mercaptobenzothiazole is 95%, benzothiazole 0.6% and sulfur 0.7%. Conducting the process at higher temperatures increases the assay. Adding crude mercaptobenzothiazole to the emulsion at 50–55° C. and isolating the product as described yields 97% mercaptobenzothiazole.

*Example 3*

An autoclave is charged with 400 parts by weight of water, 40 parts by weight of carbon bisulfide, 1 part by weight of nonionic emulsifier and 100 parts by weight of crude mercaptobenzothiazole made by the Kelly process. The mixture is stirred in the closed pressure reactor at 75–100° C. for about two hours, then cooled and the product isolated as in Example 2. The assay is mercaptobenzothiazole 96.5%, benzothiazole 0.6% and sulfur 0.4%.

*Example 4*

Water, 300 parts by weight, nonionic emulsifier, 4 parts by weight, and 25 parts by weight of monochlorobenzene are stirred vigorously at 60–70° C. to form an emulsion. There is then added 100 parts by weight crude molten mercaptobenzothiazole made by the Kelly process during which addition vigorous stirring continued. Stirring is continued for 2½ to 3 hours and the mixture is cooled to 25° C. and filtered. The product is either dried or used in wet form. It assays 95.5–96.5% mercaptobenzothiazole and less than 1% benzothiazole and tar.

It will be appreciated that the purification process described herein may be combined with other purification steps if desired.

It is intended to cover all changes and modifications of the examples of the invention herein chosen for purposes of disclosure which do not constitute departures from the spirit and scope of the invention.

What is claimed is:

1. The process for the purification of mercaptobenzothiazole which comprises dispersing mercaptobenzothiazole containing benzothiazole and sulfur as impurities in an emulsion of an organic water immiscible solvent selected from the group consisting of benzene, toluene, monochlorobenzene, dichlorobenzene, perchloroethylene and carbon bisulfide in water, the organic solvent being in minor proportion with respect to the water, thoroughly wetting and agitating the particles of mercaptobenzothiazole with the emulsion and separating mercaptobenzothiazole.

2. The process for the purification of mercaptobenzothiazole which comprises dispersing mercaptobenzothiazole containing benzothiazole and sulfur as impurities in an emulsion of $CS_2$ and water, the $CS_2$ being in minor proportion with respect to the water, heating and stirring the mercaptobenzothiazole in the emulsion, cooling and separating the mercaptobenzothiazole from the liquors.

3. The process for the purification of mercaptobenzothiazole which comprises dispersing molten mercaptobenzothiazole containing benzothiazole and sulfur as impurities in an emulsion of $CS_2$ and water containing a nonionic surface active agent, heating and stirring the mercaptobenzothiazole in the emulsion under greater than atmospheric pressure, the $CS_2$ being present in minor proportion with respect to the water cooling and separating the mercaptobenzothiazole from the liquors.

4. The process of claim 2 in which the $CS_2$ is present in amount within the range of 10–30 parts per 100 parts by weight mercaptobenzothiazole.

References Cited in the file of this patent

UNITED STATES PATENTS

| | | |
|---|---|---|
| 1,631,871 | Kelly | June 7, 1927 |
| 1,858,344 | Scott | May 17, 1932 |
| 2,090,233 | Roberts | Aug. 17, 1937 |
| 2,117,120 | Smith et al. | May 10, 1938 |
| 2,607,660 | Robertson et al. | Aug. 19, 1952 |

OTHER REFERENCES

Chu et al.: Chem. Abstracts, vol. 44, col. 2802 (1950).
Doskocil et al.: Chem. Abstracts, vol. 50, col. 16048 (1956).
Borisov et al.: Chem. Abstracts, vol. 51, col. 18513 (1957).